(12) United States Patent
Bartlett et al.

(10) Patent No.: US 12,030,828 B2
(45) Date of Patent: Jul. 9, 2024

(54) MULTI-PURPOSE PUTTY

(71) Applicants: William Charles Bartlett, Beaver, UT (US); Cheston Davis, Beaver, UT (US)

(72) Inventors: William Charles Bartlett, Beaver, UT (US); Cheston Davis, Beaver, UT (US)

( * ) Notice: Subject to any disclaimer, the term of this patent is extended or adjusted under 35 U.S.C. 154(b) by 1154 days.

(21) Appl. No.: 16/582,490

(22) Filed: Sep. 25, 2019

(65) Prior Publication Data

US 2020/0283350 A1   Sep. 10, 2020

Related U.S. Application Data

(60) Provisional application No. 62/815,533, filed on Mar. 8, 2019.

(51) Int. Cl.
*C06B 45/08* (2006.01)
*C06B 33/00* (2006.01)

(52) U.S. Cl.
CPC .............. *C06B 45/08* (2013.01); *C06B 33/00* (2013.01)

(58) Field of Classification Search
None
See application file for complete search history.

(56) References Cited

U.S. PATENT DOCUMENTS

| | | | | |
|---|---|---|---|---|
| 4,756,719 A | * | 7/1988 | Saito | ......................... C10L 5/40 44/641 |
| 2008/0092437 A1 | * | 4/2008 | Helms | ..................... C10L 5/368 44/520 |
| 2018/0148659 A1 | * | 5/2018 | Mathews | ............... B65D 75/54 |

FOREIGN PATENT DOCUMENTS

FR     2564851     * 11/1985

* cited by examiner

*Primary Examiner* — Aileen B Felton
(74) *Attorney, Agent, or Firm* — James A. Italia; Italia IP

(57) ABSTRACT

A multi-purpose putty product usable as a lamp fuel, first aid medication, water proofing agent, water sealant, and UV responsive marker is shown and described. The putty component may include waxes, oils, pine gum rosin, powdered metallic thermite fuel, and cotton fibers. Optionally, the putty may include a colorant and plant essential oil as an odorant. The putty may be provided in kit form, with a receptacle and closure, and a tool enabling putty product in the receptacle to be exposed and held erect for service as a wick while burning.

2 Claims, 1 Drawing Sheet

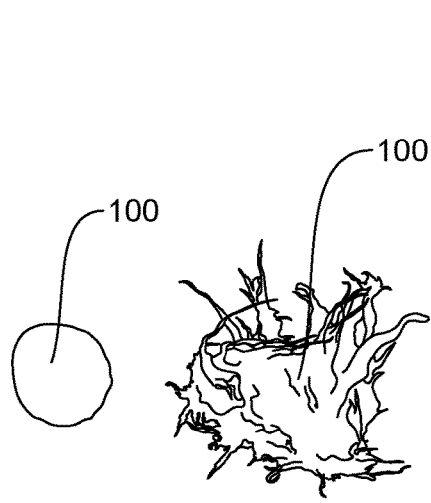
FIG. 1
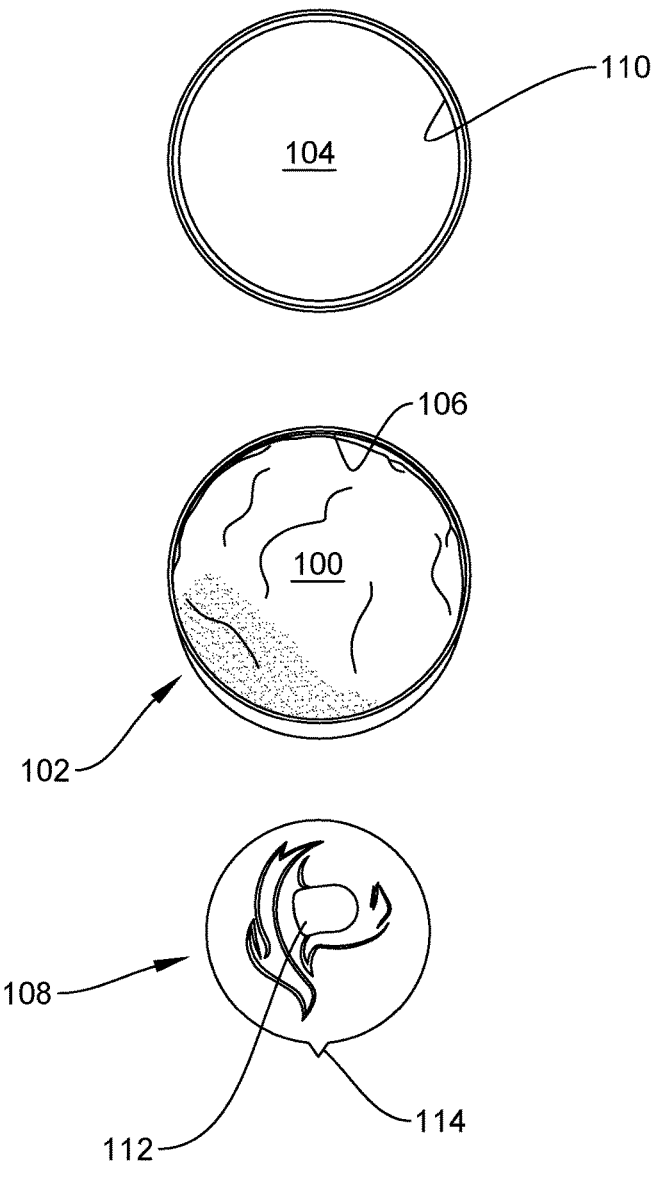
FIG. 3
FIG. 2
| 0.5 to 4.0 oz | Paraffin wax, beeswax, or soy wax |
| 0.5 to 4.0 oz | Mineral oil, petroleum jelly, or plant oil |
| 0.5 to 4.0 oz | Pine gum rosin |
| 0.1 to 2.0 oz | Cotton balls |
| 1.0 to 6.0 g | Magnesium powder or combined magnesium and aluminum powder |
| 0.25 to 1.0 g | Pigment powder or dye |
FIG. 4

MULTI-PURPOSE PUTTY

CROSS-REFERENCE TO RELATED APPLICATION

This application claims the benefit of priority to US Provisional Utility Application No. 62/815,533, filed Mar. 8, 2019, the contents of which are incorporated by this reference.

FIELD OF THE INVENTION

The present invention relates to a putty compound usable particularly in natural environments as a fire accelerant, torch, candle, insect repellent, antibiotic ointment, sun screen, pain reliever, UV light responsive marker, and waterproofing agent and leak sealant for fabrics.

BACKGROUND OF THE INVENTION

When people go to natural environments and are away from amenities of buildings, many needs arise. A camper for example may need to be able to light a fire for light, heat, and cooking food, may require an insect repellent, a sun protective product for the skin, a medical product such as antibiotic ointment or a general pain reliever, a fire based beacon, and a waterproofing agent or leak sealant for fabrics such as tents.

SUMMARY OF THE INVENTION

The present invention provides a single product capable of meeting the above needs. Viscous fluid materials such as wax, pine gum rosin, mineral oil or petroleum jelly, and essential oils may be mixed together, then blended with a pigment or dye and finely comminuted magnesium powder or combined aluminum and magnesium powder. The resulting putty is then infused into a fibrous mass such as cotton fiber balls.

The fiber imparts ignitability, and acts as a wick when the putty is used as a candle or torch. The putty component may be manually pressed from the fibers to be used as an ointment or other medical agent, as a waterproofing or sealing agent, or as a fuel for combustion in the absence of the fibers.

The putty is malleable and mildly adhesive, and can be formed to conform to diverse objects and to cling thereto.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of a multi-purpose putty product in a first condition shown manually compressed, and in a second condition with fibers pulled to the point of being slightly separated from fluent components and exposed, according to at least one aspect of the disclosure;

FIG. 2 is a top view of a container and cap for carrying small amounts of the multi-purpose putty product in the form of a kit, and a tool used with the kit;

FIG. 3 is a perspective view of the container and tool used to function as a lamp or torch, using the multi-purpose putty product as a fuel; and FIG. 4 is a table showing ingredients of the multi-purpose putty product and recommended ranges of quantities of each ingredient to be used.

DETAILED DESCRIPTION

Referring first to FIG. 1, according to at least one aspect of the invention, there is shown a multi-purpose putty product 100 in two forms. To the left, multi-purpose putty product 100 is shown molded into a sphere. This configuration conceals a fibrous component visible as projecting from the center of the mass of multi-purpose putty product 100 at the right of FIG. 1. The spherical form may be pinched by the fingers and pulled apart to assume the configuration seen at the right of FIG. 1 and to reveal the fibrous component.

Multi-purpose putty product 100 may comprise primary constituent materials including wax, oil, pine tree exudate, at least one combustible metal, the latter comminuted to powder, and plant fibers. These primary constituent materials may be blended together to produce multi-purpose putty product 100 seen in FIG. 1. More particularly, and referring also to FIG. 4, the wax is substantially at least one of paraffin wax, beeswax, and soy wax. Also, the oil is substantially at least one of mineral oil, petroleum jelly, and a plant oil. The pine tree exudates may be substantially pine gum rosin. Alternatively stated, terpenes may be removed from the pine tree exudate. The plant fibers may be substantially cotton fibers, although other plant or organic fibers may be substituted. The combustible metal is a fuel component of thermite. More specifically, the fuel component of thermite is at least one of aluminum and magnesium.

As employed herein, reference to a constituent as being "substantially" the named constituent signifies that absolute purity is not demanded. Rather, incidental occurrences of foreign substances, such as inevitable contaminants and substances which are difficult to remove in ordinary fabrication processes may be present.

Optionally, multi-purpose putty product 100 may further comprise a colorant blended into the primary constituent materials. The colorant comprises at least one of a pigment powder or a dye.

The invention may be considered either multi-purpose putty product 100, or alternatively, a multi-purpose kit for fostering survival in natural environments. The multi-purpose kit provides multi-purpose putty product 100 and apparatus for containing and using multi-purpose putty product 100. Referring also to FIG. 2, the multi-purpose kit comprises a receptacle 102 including a closure 104 and an interior perimeter 106, a tool 108, and multi-purpose putty product 100. Multi-purpose putty product 100 is contained in receptacle 102. Tool 108 has a perimeter 110 similar yet smaller than the interior perimeter 106 of receptacle 102, and an opening 112 extending entirely through tool 108.

In the multi-purpose kit, the wax is provided in a quantity in a range of 0.5 to 4.0 ounces, the oil is provided in a quantity in a range of 0.5 to 4.0 ounces, and the pine gum rosin is provided in a quantity of 0.5 to 4.0 ounces. The cotton fibers are provided in a form of cotton fiber balls of weight in a range of 0.1 to 2.0 ounces each. The fuel component of thermite is provided in a quantity in a range of 1.0 to 6.0 grams. The cotton fiber balls may be of the type commonly retailed in drug stores for medicinal purposes, for example.

Where provided as an option in the multi-purpose kit, the colorant is provided in a quantity in a range of 0.25 to 1.0 gram.

As seen in FIG. 2, tool 108 may comprise a spike 114 projecting outwardly therefrom, for facilitating plying, puncturing, and exposing the fibers of the putty.

Multi-purpose putty product 100 may be produced by the following method. For quantities suitable for producing the multi-purpose kit described above, quantities in the ranges shown in FIG. 4 may be utilized. For larger quantities, proportions arising from the quantity ranges shown in FIG. 4 may be scaled up to suit.

The wax(es), the pine gum rosin, and the oil(s) may be heated to a range of 100 to 300 degrees Fahrenheit and mixed to form a homogeneous liquid. The liquid is infused into the cotton balls or other fibrous material. The mixed fibers and fluid components are then cooled to a range of 50 to 100 degrees Fahrenheit and placed in a mechanical mixer. The colorant, the thermite fuel, and the plant essential oils, if used, are placed in the mechanical mixer. All materials placed in the mechanical mixer are then blended using the mixer.

Multi-purpose putty product 100 has diverse uses, particularly in a natural environment such as a forest or a cave. Multi-purpose putty product 100 may be used to ignite a wood fire, or, using receptacle 102 and tool 108, as a candle or torch. Some of the cotton fiber is drawn through hole 112 of tool 108 and left exposed. Size of the flame is adjusted by varying the amount of cotton fiber protruding through hole 112. Components of multi-purpose putty product 100 other than the cotton fiber may be manually separated using one's fingers. The malleable, mildly adhesive resultant mass can be used as a waterproofing agent and sealant for fabric and rubbery strata. The mass may be molded to and adhered to environmental objects such as trees for use as a marker. Because the mass is UV responsive, patches of the mass may be left strategically as markers to define a path e.g. through a forest. The path may then be followed by someone having a UV emitting lamp, as the patches of the mass will illuminate responsive to UV light.

The fluid components of multi-purpose putty product 100 may also serve as a topical ointment to be used as an insect repellent, antibiotic ointment, sun screen, pain reliever to treat insect bites cuts, burns, scrapes, as an antifungal agent, and to help stop minor bleeding.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

We claim:
1. A composition comprising:
 a putty component comprising:
  a wax comprising at least one of paraffin wax, beeswax, and soy wax;
  an oil comprising at least one of mineral oil, petroleum jelly, and a plant oil;
  pine gum rosin;
  a fuel component of thermite comprising at least one of aluminum and magnesium, comminuted to powder; and
  a colorant comprising at least one of a pigment powder or a dye; and
 cotton fiber balls;
 wherein:
  the putty component is infused in the cotton fiber balls;
  the fuel component of thermite is present in the composition at a weight percentage in a range of 0.3% to 11%; and
  the colorant is present in the composition at a weight percentage in the range of 0.06% to 2.4%.
2. A multipurpose kit comprising:
 the composition of claim 1;
 a receptacle; and
 a tool;
 wherein the composition is retained in the receptacle.

* * * * *